United States Patent [19]

Metcalf

[11] Patent Number: 4,865,269

[45] Date of Patent: Sep. 12, 1989

[54] OVERTRAVEL STOP AND NEUTRAL POSITION LOCK

[75] Inventor: Jeffrey D. Metcalf, Albion, Ill.

[73] Assignee: Sundstrand Corp., Rockford, Ill.

[21] Appl. No.: 215,814

[22] Filed: Jul. 6, 1988

[51] Int. Cl.⁴ .................................................. B64C 13/14
[52] U.S. Cl. .................................. 244/75 A; 244/75 R; 244/224
[58] Field of Search ............... 244/75 A, 75 R, 76 R, 244/78, 224

[56] References Cited

U.S. PATENT DOCUMENTS

| | | | |
|---|---|---|---|
| 2,536,874 | 1/1951 | Cunningham, Jr. | 121/40 |
| 2,590,716 | 3/1952 | Lisle | 60/97 |
| 2,804,054 | 8/1957 | Geyer | 121/40 |
| 3,046,945 | 7/1962 | Hayner | 121/41 |
| 4,080,875 | 3/1978 | Repolovsky et al. | 92/29 |
| 4,173,322 | 11/1979 | MacDonald | 244/75 A |
| 4,280,398 | 7/1981 | Kerscher et al. | 92/29 |
| 4,470,340 | 9/1984 | Goans et al. | 92/29 |
| 4,496,121 | 1/1985 | Berlin | 244/75 A |
| 4,526,058 | 7/1985 | Runkel et al. | 74/531 |
| 4,595,158 | 6/1986 | Robinson | 244/75 R |
| 4,603,594 | 8/1986 | Grimm | 74/89.15 |
| 4,633,984 | 1/1987 | Hudson | 192/9 |

Primary Examiner—Joseph F. Peters, Jr.
Assistant Examiner—Rodney Corl
Attorney, Agent, or Firm—Antonelli, Terry & Wands

[57] ABSTRACT

An aircraft flight control surface actuator that prevents against overtravel is provided with a lock which includes a pin (76) that is urged by spring (b 74) toward the wall (68) that is part of control gear (56) which travels along the axis of a threaded shaft (42) in response to rotation of main shaft (16). An aperture (70) in the wall (68) is aligned with pin (76) only at a neutral position of the flight control surface (12). Lever (80) depresses pin (76) against the force of spring (74) only so long as hydraulic system pressure for the actuator is supplied to cylinder (84).

15 Claims, 2 Drawing Sheets

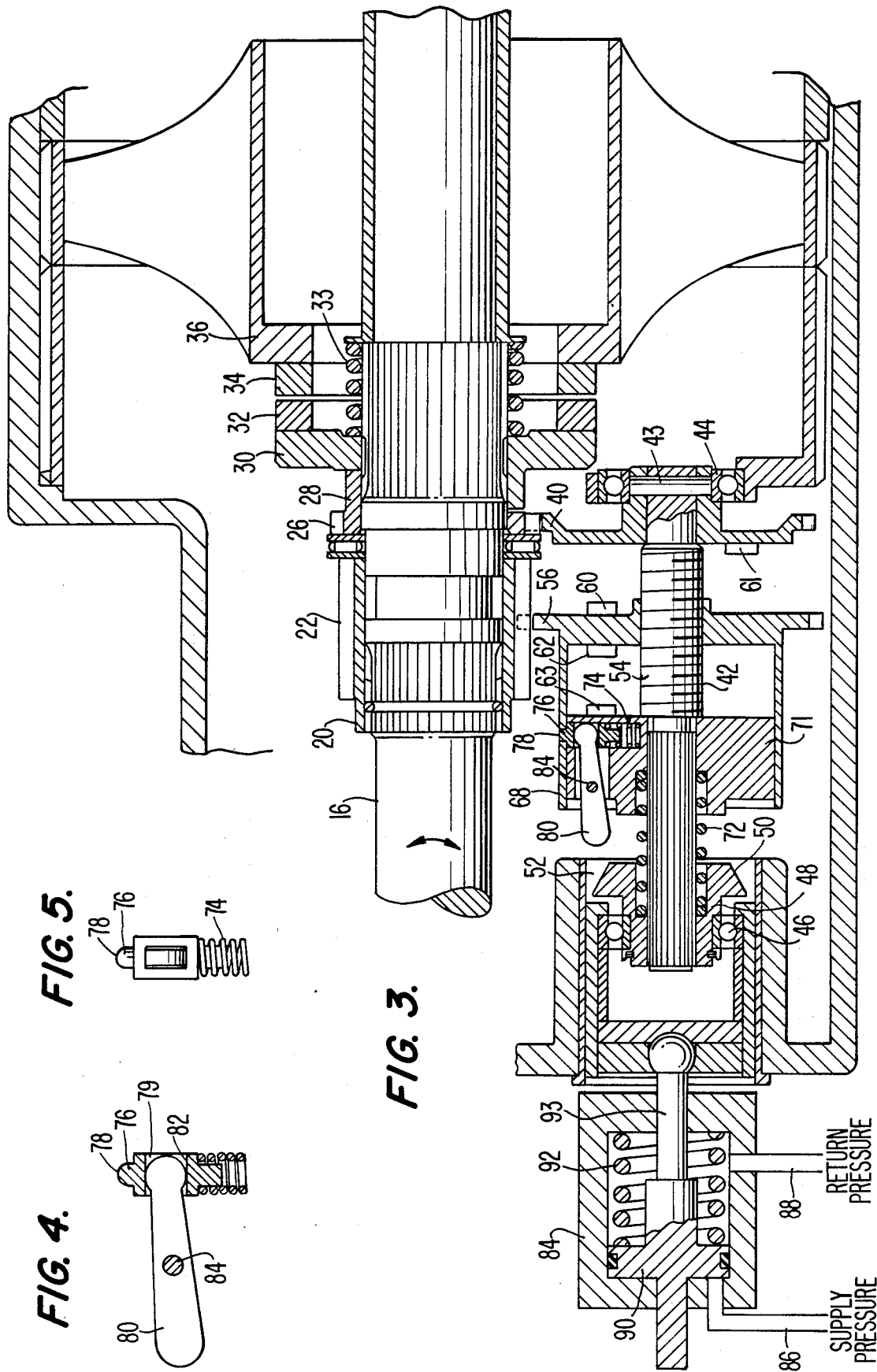

4,865,269

OVERTRAVEL STOP AND NEUTRAL POSITION LOCK

TECHNICAL FIELD

This invention relates to flight control surfaces powered by hydraulic fluid pressure under control of the pilot, and more particularly to the locking of such flight control surfaces in a neutral position during hydraulic fluid de-pressurization thereby to avoid flutter and allow a semi-stable flight.

BACKGROUND ART

Overtravel stops are widely used in conjunction with actuators for controlling the position of aircraft flight control surfaces as explained in U.S. Pat. No. 4,641,737 to Gillingham and Metcalf issued Feb. 10, 1987. When loss of control results, Federal Aviation Requirements demand that protection against flutter be provided. A number of approaches exist in the prior art including those set forth in the following U.S. Pat. Nos.: 4,603,594 to Grimm; 4,496,121 to Berlia; 4,633,984 to Hudson; 4,173,332 to Macdonald; 4,526,058 to Runkel, et al; and 2,804,054 to Geyer.

DISCLOSURE OF INVENTION

A major object of the present invention is to provide an aircraft flight control surface lock for an actuator having overtravel stops in the general configuration as disclosed in U.S. Pat. No. 4,641,737 mentioned above by providing a novel lock mechanism that is automatically actuated in response to loss of operating hydraulic system pressure and automatically released upon re-establishment of the hydraulic system pressure.

Another object is to provide a novel cam operated locking mechanism that without operating hydraulic fluid pressure urges a pin toward a locking position and with said fluid pressure restrains the pin in a non-locking position. Associated with the pin is a cylindrical wall having a pin receiving aperture that is aligned only at a predetermined or neutral position of the aircraft flight control surface thereby to prevent flutter of such control surface.

A further object of the invention is to provide a novel sliding mechanism for moving a sloping cam surface toward a follower lever against a spring bias force in response to operating hydraulic system pressure. The follower lever is employed to overcome a further spring bias force applied to a locking pin that is so positioned as to intercept an actuator part when flutter causes the aircraft control surface to pass a neutral position.

These and other objects will become more fully apparent from the claims, and from the detailed description when read in conjunction with the appended drawings.

BRIEF DESCRIPTION OF DRAWINGS

FIG. 3 is a view similar to FIG. 2 but showing the position of the lock components when the working hydraulic system fluid has been lost;

FIG. 4 is a side view of a portion of the locking mechanism that is selectively engaged depending upon the presence of hydraulic system pressures; and FIG. 5 is an end view of the locking mechanism of FIG. 4.

BEST MODE OF CARRYING OUT THE INVENTION

An embodiment of the present invention is described as part of a bi-direction overtravel stop mechanism for a rotating shaft that is adapted for causing movement and positioning of aircraft components as disclosed in the above-identified U.S. Pat. No. 4,641,737. The disclosure of that patent is hereby incorporated by reference and the description herein will proceed with emphasis on the novel locking structure provided by the present invention and its relationship to the bi-directional overtravel stop disclosed therein.

Figure 1:
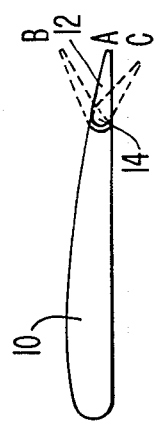
FIG. 1 is a diagrammatic view of an aircraft control surface of a type adapted for control by the present invention.
Figure 2:
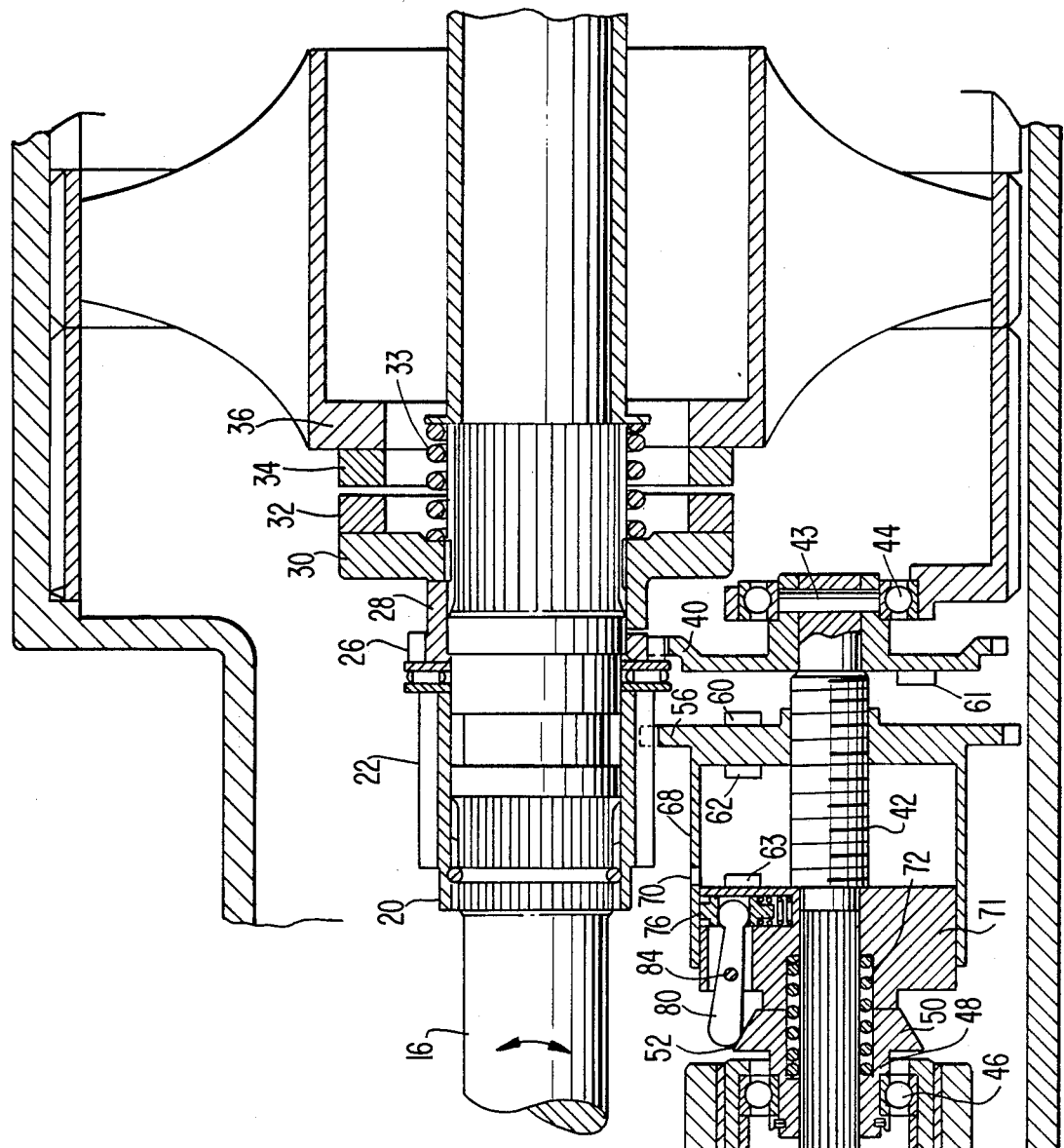
FIG. 2 is a diagrammatic view of a portion of a known system for the aircraft control surface control in which of the present invention has been physically accommodated and showing the position of the novel lock components in their normal restrained position when the working hydraulic system pressure is present.
Figure 2:
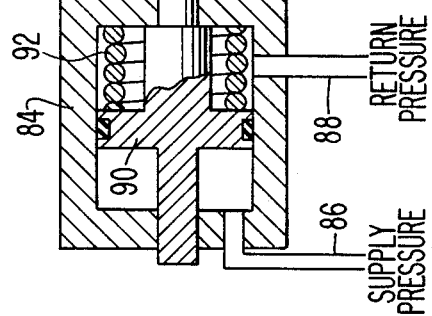

In FIG. 1, a profile of a wing section 10 is illustrated with a trailing edge control surface 12 that is shown in its neutral position A and pivotable about an axis 14 by the pilot to a dotted line position B or position C. Movement of the control surface 12 may be provided by controlling rotation of a main shaft 16 as illustrated in FIGS. 2 and 3. Where a hydraulic fluid motor is employed to drive shaft 16 and a system pressure failure occurs, the control surface 12 swings away from its B or C position and will continue to flutter unless restrained. The locking mechanism of the present invention is adapted to lock the control surface 12 in its neutral position A.

The main shaft 16 is provided with a sleeve 20 that is rigidly secured thereto having gear teeth 22 that extend along the length of the sleeve 20. On the other side of bearing structure 24 is a shift gear 26 which is part of annular member 28 which contains a flange 30 and stop members 32, and is mounted for axial sliding movement against the bias of spring 33. Fixed stops 34 may be formed as part of, or otherwise be secured to a housing 36. Shift gear 26 rotates with main shaft 16 and contains a figuration that provides the necessary axial movement to cause stop member 32 to engage fixed stops 34 all as disclosed more fully in the aforesaid U.S. Pat. No. 4,641,737.

For purposes of understanding the present invention, it is sufficient to note that limiting gear 40 is driven by shift gear 26 and that until a limit position is reached, shift gear 26 and the gear having teeth 22 rotate concomitantly.

Journalled for rotation in housing 36 is a threaded shaft 42 that is rigidly connected as by a pin 43 to the hub of gear 40 which may be mounted in bearing 44.

The axis of threaded shaft 42 is parallel to the axis of main shaft 16, and the end opposite bearing 44 is supported by bearing 46, the inner race of which is mounted on the hub 48 of a member 50 that is splined to turn with shaft 42 and yet be axially slidable in housing 36 toward the left end of shaft 42 to a position as illustrated in FIG. 3. The member 50 rotates with threaded shaft 42 and is provided with a cam body having a cam surface 52 that may, if desired, be formed to have the form of a frustrum of a right circular cone as illustrated.

A support member 71 having a splined bore that fits on threaded shaft 42 is urged to the right to be against the left end of the threaded central section 54 by a compression spring 72 that also urges member 50 in the opposite direction.

The threaded shaft 42 contains a central section that is formed with an external helical thread 54 that mates with an internal helical thread in the bore of control gear 56 which, in turn, has teeth that constantly engage gear teeth 22 on main shaft 16. The main shaft 16 is rotationally driven by a motor (not shown) that is operable when a hydraulic system fluid pressure is available.

The gear teeth 22 and the shift gear 26 are driven at the same rate. Due to different gear ratios involved, gears 40 and 56 revolve at slightly different rates relative to one another. Since threaded shaft 42 rotates with limiting gear 40 and the gear 56 rotates at a slightly different rate than the threaded shaft 42, gear 56 translates axially along the threaded shaft 54 between limit positions determined when stop member 60 on gear 56 engages stop member 61 on limiting gear 40 or when stop member 62 on the other side of gear 56 engages stop member 63 on support member 71 all as explained in the aforementioned U.S. Pat. No. 4,641,737.

It should be observed that control gear 56 moves axially in coordination with the rotation of main shaft 16 and thus has an instantaneous axial position that corresponds with the instantaneous position of the flight control surface 12 as shown in FIG. 1.

Control gear 56 is provided with a member in the form of a hollow cylinder 68 that extends from a side face of gear 56 and is coaxially positioned with the gear and threaded shaft 42. An aperture 70, best shown in FIG. 2 is provided in a cylindrical wall at about the mid-point of the wall length. The wall length is generally equal to or slightly greater than the length of the threaded central section 54 of shaft 42.

Support member 71 has a radially extending bore into which a cylindrical compression spring 74 is seated as illustrated in FIGS. 2-5. Pin 76, also located in the same radial bore on top of compression spring 74, has a nose portion 78, see FIGS. 4 and 5, that is shown in FIG. 3 in a position extending into aperture 70 because of the bias force supplied by the spring 74.

Pin 76 also has an opening 79 into which one end of lever 80 extends. The lower surface 82 of opening 79 is engaged by the end of lever 80 which is capable of retracting the nose portion 78 of pin 76 from the aperture 70 in the cylindrical wall (see FIG. 2), such retracting movement being against the bias of spring 74 and away from the inner wall surface of the hollow cylinder 68.

Lever 80 may be mounted in a slot or other type of opening of a suitable shape in the support member 71 for pivotal movement about the axis of pin 84. The outer end 86 of lever 80 is adapted to slide axially along cam surface 52 and be raised as illustrated in FIG. 2, or to be lowered by spring 74 when cam surface 52 is moved to the left and positioned as illustrated in FIG. 3.

When cam surface 52 is moved to the left a illustrated in FIG. 3, the nose portion 78 of pin 76 is pressed against the inside surface of hollow cylinder 68. The length of the cylinder 68 is sufficient so that the nose portion 78 never extends beyond the wall of cylinder 68. The size of aperture 70 is such that the nose portion of pin 76 will move into aperture 70 under the force of spring 74 whenever alignment of the pin 76 and aperture 70 occurs.

The control cylinder 84 has a hydraulic operating pressure line 86 and a return line 88 on opposite sides of piston 90. Piston 90 is urged against the operating pressure by spring 92. Extending from piston 90 is a piston stem 93 that is arranged to push against the force of compression spring 72 to move cam surface 52 under the end 86 of lever 80 when operating hydraulic pressure is present. When hydraulic operating pressure is lost, the combined forces of springs 72 and 92 operate to move cam surface 52 to the left as viewed in FIG. 2 to a position as illustrated in FIG. 3 so that cam surface 52 is no longer in engagement with the free end 86 of lever 80 thereby allowing pin 76 to be urged outwardly against the inside surface of cylinder 68 by spring 74.

When hydraulic pressure is lost, rotation of main shaft 16 is not under the control of the pilot, but instead rotates first in one direction and then in the opposite as the flight control surface 12 flutters. When flight control surface 12 reaches a predetermined or neutral position such as illustrated at A in FIG. 1, the nose portion 78 of pin 76 will be aligned with the aperture 70 in the wall of hollow cylinder 68 and thus be projected into the hole 70 by the bias force of spring 74.

Under the foregoing conditions, the gear 56 is prevented from rotating and its engagement with gear teeth 22 on the main shaft has the effect of locking the main shaft and the flight control surface against further movement. The location of aperture 70 in the wall of hollow cylinder 68 thus controls the precise position of flight control surface 12 when locked.

One advantageous feature of the present invention resides in the ease by which the lock is released without maintenance or servicing. When the operating hydraulic pressure is restored, piston 90 moves from the position shown in FIG. 3 to the position shown in FIG. 2 without manual intervention and the pilot is then able to resume control over the operation of the main shaft and the flight control surfaces moved thereby.

Another important advantage of the lock of the present invention is that the space requirements are such that it can be used with a structure which has overtravel stops.

Although only a single embodiment of the invention has been described, all changes and modifications which fall within the scope of the claims are intended to be covered thereby.

I claim:

1. In a lock for constraining flutter movement of an aircraft control surface after loss of hydraulic system pressure utilized for pilot operation, a first cylinder having on one side of a piston mounted in said cylinder a connection for receiving said hydraulic system pressure and on the other side of said piston a compression spring operating in opposition to the force supplied by said hydraulic pressure;

a main shaft mounted for rotation and connected to control the position of said aircraft control surface;

a control gear mounted for rotation with said main shaft about an axis parallel to the main shaft axis;

a hollow cylinder open at one end and extending from one side of and coaxially disposed with said control gear; and means responsive to the position of the piston in said first cylinder for selectively engaging a surface of said hollow cylinder only when said hydraulic system pressure is below a predetermined level and the control surface reaches said neutral position to thereby lock the aircraft control surface against further movement.

2. The lock as defined by claim 1, wherein said piston is mounted for reciprocating movement along an axis that is coaxial with the control gear axis and carries a member having a cam surface; and wherein said hollow cylinder surface engaging means includes:
- a second shaft for rotationally supporting said control gear;
- a support member carried by said second shaft at a position fixed along the length of said shaft; and
- a lever mounted on said support member for pivotal movement in response to reciprocating movement of said piston and having one end extending into said hollow cylinder in a direction toward said control gear.

3. The lock as defined by claim 2, wherein said support member includes a bore and means including a pin mounted in said bore for reciprocal movement that is in a direction that is radial relative to said second shaft axis at a location which at all times remains within said hollow cylinder and longitudinally fixed relative to said second shaft.

4. The lock as defined by claim 3, wherein said control gear translates along the axis of the second shaft in response to relative rotation therebetween and the wall of the hollow cylinder contains an aperture for receiving said pin to lock said control gear against rotation relative to said second shaft.

5. The lock as defined by claim 4, further having a shift drive gear positioned to rotate with said main shaft, a limit gear having stop means on a side thereof for rotationally driving said second shaft in the same rotational direction as said control gear but at a different rotational velocity, and stop means at a side of said control gear opposite said one side adapted to engage the stop means on said limit gear when the main shaft has turned a predetermined number of rotations from a position corresponding to said aircraft control surface neutral position.

6. The lock as defined by claim 5 wherein the pin has a nose portion that is spring biased toward the adjacent hollow cylinder wall and the pin is restrained against the force of the spring bias by said one lever end when said other lever end is engaged with said cam surface.

7. A control surface lock for flutter constraint of a control surface of an aircraft in cooperative combination with a hydraulic powered actuator therefor, wherein hydraulic system pressure employed for operating the control surface maintains said lock in a released condition and loss of said pressure causes the control surface to be locked in a neutral position comprising:
- a cylinder to which said system pressure is applied, said cylinder having a piston movable to a first position when system pressure is present and to a second position when system pressure is lost;
- means including a cam surface attached to move with said piston;
- a lever arm mounted for pivotal movement about a central position therealong and having two opposed end portions, one of said end portions being engaged with said cam surface when the system pressure is applied to the cylinder and free of engagement when the system pressure is not applied to the cylinder; and
- means responsive to the movement of a second of said lever arm portions for causing the control surface lock to become engaged only when the aircraft control surface is moved to said neutral position.

8. The lock as defined in claim 7 further including:
- a pin arranged to move with said second lever arm end portion between a locking position and an unlocking position; and
- means for biasing said pin toward a locking position, said pin being restrained against the force of said biasing means to maintain said pin in a retracted non-locking position when the system pressure above a predetermined level is applied to the cylinder and in an extended locking position when the system pressure is applied to the cylinder is less than said predetermined level.

9. The lock as defined in claim 8, wherein the control surface lock means further comprises:
- a rotatable main shaft having a gear attached thereto;
- a threaded shaft parallel to the main shaft and having a central portion located between stop members at opposite ends thereof, said central portion being provided with a helical thread;
- a control gear mounted on said threaded shaft in a gear engaging relationship with said main shaft gear and having an internal helical thread which is in threaded engagement with the central portion of said threaded shaft whereby rotation of the main shaft gear causes the control gear to traverse a portion of the length of the second shaft; and
- means on the control gear including an aperture sized to receive said pin, said aperture being positioned relative to said control gear and said pin to lock the control gear against rotation when system pressure is lost and flutter movement of the control surface causes the control surface to reach said neutral position.

10. The lock as defined in claim 9, further including a hollow cylinder having a cylindrical wall which surrounds said pin and a portion of said lever arm, said cylindrical wall being mounted to translate with said control gear and having said aperture located in a position which coincides with said pin when said control surface passes through said neutral position.

11. The lock as defined in claim 9, further including a shift gear mounted for rotation with said main shaft;
- means rotationally connecting said shift gear to said threaded shaft;
- stop means located at spaced positions along said threaded shaft to limit the relative rotation between the control gear and the threaded shaft in either direction from the position of the control gear which corresponds to said control surface neutral position; and
- a hollow cylinder mounted to have an axis coaxial with the control gear axis and a side wall which contains said aperture.

12. A control surface lock for flutter constraint of a control surface of an aircraft in cooperative combination with a hydraulic actuator therefor, wherein hydraulic system pressure employed for operating the control surface maintains said lock in a released condition and loss of said pressure causes the control surface to be locked in a neutral position comprising:
- a control gear having outer peripheral teeth mounted for rotation about an axis for rotational engagement with a main shaft driven by means powered by means including said hydraulic system pressure;
- a hollow cylinder mounted to have an axis coaxial with the control gear axis, said cylinder having a length which is measured in a direction parallel to the gear axis from one side of said control gear, there being an aperture in a side wall of the cylinder positioned at about one-half the length of the cylinder wall from said one gear side;

a threaded shaft parallel to the main shaft having an axis that is coaxial with the control gear axis and having thread means effective to cause said control gear to move along the length of the threaded shaft in a direction depending upon the direction of rotation of the main shaft;

a pin mounted within said cylinder for reciprocal movement in a direction that is perpendicular to the axis of the cylinder, said pin being fixed against movement along the axis of the threaded shaft and having an end portion that is adapted to extend into the side wall aperture when properly aligned;

means biasing said pin in a direction toward a side wall of said hollow cylinder; and means for restraining said pin from extending into the side wall aperture when said hydraulic fluid pressure is above a predetermined operating level and for releasing said pin to permit the pin to extend into the side wall aperture when said hydraulic fluid pressure is below said predetermined operating level.

13. The control surface lock as defined in claim 12, wherein said restraining means includes a cam member mounted for movement in a direction parallel to the axis of the threaded shaft between a first position and a second position depending upon the of hydraulic system pressure; and further including a lever associated with both said pin and with said cam means for displacing said pin against the bias force of said biasing means.

14. A control surface lock for flutter constraint of a control surface of an aircraft in cooperative combination with a bi-directional overtravel stop for a main shaft wherein hydraulic system pressure employed for operating the control surface maintains said lock in a released condition and loss of pressure causes the control surface to be locked in a neutral position comprising:

a housing having a fixed stop;
a gear fixed on the main shaft;
a shift gear about the main shaft;
a stop member associated with the shift gear;
a cam structure adapted to secure the shift gear for rotation with the main shaft when the main shaft is within its travel limits and to shift the shift gear axially to engage the stop member with the fixed stop when the shift gear rotationally shifts relative to the main shaft;

a threaded shaft parallel to the main shaft and secured to rotate with a limiting gear engaging the shift gear;

a control gear with a central threaded opening mounted coaxially with the threaded shaft, said control gear engaging the main shaft gear with a different gear ratio than the gear ratio of said limiting gear and said shift gear;

gear stops fixed to rotate with the threaded shaft on opposite sides of the control gear and adapted to stop rotation of the control gear with respect to the limiting gear when shaft travel limit in either direction is reached;

a hollow cylinder mounted coaxially with the control gear and having a length which is measured from one side of the gear parallel to the gear axis, there being an aperture in a side wall of the cylinder;

a pin mounted within said cylinder at a fixed position relative to the longitudinal axis of the threaded shaft for reciprocal movement in a direction that is perpendicular to the axis of said cylinder and spring biased toward a side wall of said cylinder;

said pin having an end portion that is adapted to extend into the side wall aperture when properly aligned;

means for restraining said pin from extending into the side wall aperture when said hydraulic fluid pressure is above a predetermined operating level and for releasing said pin to permit the pin to extend into the side wall aperture when said hydraulic pressure is below said predetermined operating level.

15. The lock as defined in claim 14 wherein said restraining means includes a cam member having a sloping surface mounted for movement in a direction parallel to the threaded shaft axis between a first position and a second position depending upon the hydraulic fluid pressure; and means including a lever associated with both said pin and with the sloping surface of said cam means for displacing said pin against the bias force of said spring.

* * * * *